No. 851,765. PATENTED APR. 30, 1907.
T. M. MORGAN.
CEMENT KILN.
APPLICATION FILED MAR. 1, 1906.
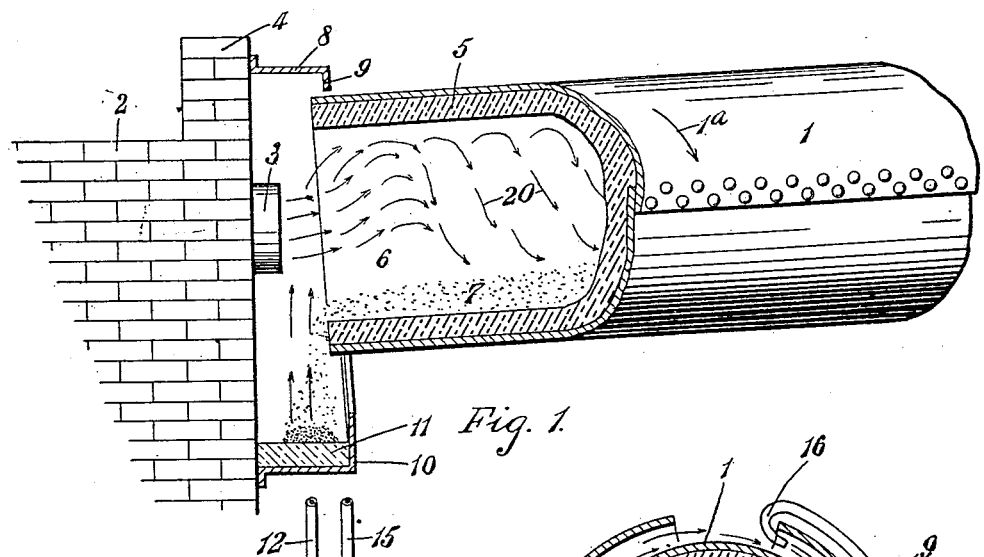
Fig. 1.
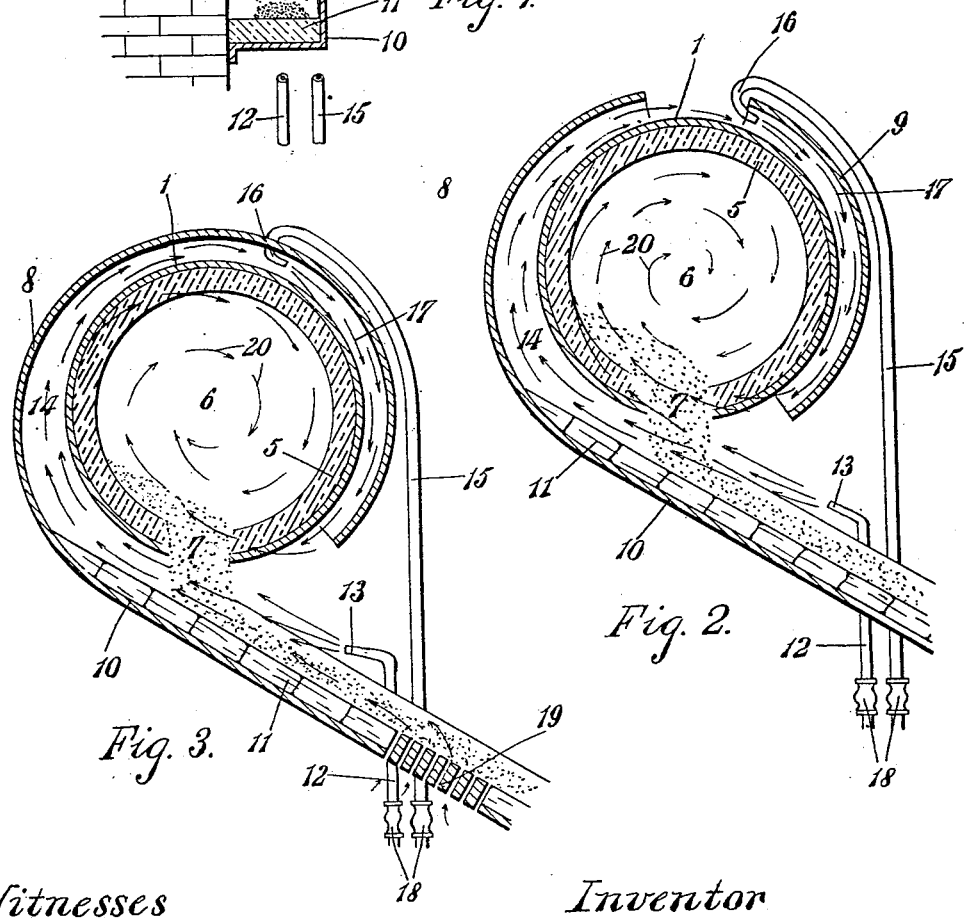
Fig. 2.
Fig. 3.
Witnesses
Stuart R. W. Allen.
William C. Armstrong.
Inventor
Thomas M. Morgan,
By Fred B. ......., Atty.

UNITED STATES PATENT OFFICE.

THOMAS MATTHEW MORGAN, OF LONGUE POINTE, QUEBEC, CANADA.

CEMENT-KILN.

No. 851,765.    Specification of Letters Patent.    Patented April 30, 1907.

Application filed March 1, 1906. Serial No. 303,582.

*To all whom it may concern:*

Be it known that I, THOMAS MATTHEW MORGAN, of the village of Longue Pointe, in the county of Hochelaga, Province of Quebec, and Dominion of Canada, have invented certain new and useful Improvements in Cement-Kilns, of which the following is a full, clear, and exact description.

My invention relates to the process of burning cement in kilns of the rotary type, and one of the main objects is to impart to the flame of combustion a swirling or revolving motion, thereby lengthening its passage through the kiln and bringing it into more intimate contact with the circumference of the kiln.

A further object consists in utilizing a large proportion of the heat contained in the clinker or cement, as it is discharged from the kiln, to raise the temperature of a volume of air which is forced into the kiln and mixed with the inflammable gas to complete its combustion.

In accomplishing these objects, I provide circumferential baffle plates at the mouth of the kiln and an inclined discharge way for the cement as it drops from the kiln. I further provide one or more streams of steam or air under pressure, which is passed over the hot cement and around the intervening channel between the baffle plates and the kiln, and from thence into the kiln. The stream of air, thus drawn into the kiln, is heated to a high temperature and is given a revolving motion so that when it comes in contact with the flame of combustion it imparts its motion to said flame and becomes thoroughly mixed with the inflammable gas, thereby aiding in the complete combustion of the latter. As cold air is excluded from the kiln, and as the current of air, which is passed over the clinker and around the circumferential baffle plates, becomes heated to a high temperature, immediate combustion will take place with the inflammable gas without reducing the temperature to any extent.

In the drawings which illustrate my invention;—Figure 1 is a sectional perspective view showing the relative positions of the parts and the swirling motion assumed by the flame in its passage through the kiln. Fig. 2 is an end view of the kiln, showing the baffle plates and the inclined passage way for the cement, and also the direction of impact of the steam or compressed air. Fig. 3 is a view similar to Fig. 2 showing an alternative construction.

Referring to the parts, 1 designates a cylinder of the usual type revolving in the direction of the arrow 1ª.

2 denotes a hollow fire brick structure adjacent to the mouth of the cylinder 1, having a flue 3 adapted to discharge gas or other material into the kiln. 4 is an extension wall above the structure 2 for protecting the operators from the intense heat. 5 is a lining of fire brick, or other suitable material, inclosing the cylindrical space 6. 7 represents the cement which is fed into the inclined cylinder at the opposite end, and which is gradually advanced by a revolving motion until it is discharged from the mouth of the kiln.

8 represents a baffle plate, which is fastened to the front wall 4 of the structure 2 at the mouth of the cylinder. A downwardly projecting flange 9 on the baffle plate, is adapted to fit as closely as possible around the revolving cylinder 1 to prevent the escape of the heated air and to prevent the ingress of cold air. In the preferred form of construction, the baffle plate 8 extends to a point near the top of the cylinder, as shown in Fig. 2. A second baffle plate 9, similar to the first, is attached to the opposite side of the cylinder, as shown in Fig. 2, and extends approximately one third of the distance around the cylinder. An inclined discharge way 10 for the cement, is formed by extending the baffle plate 8 tangentially from the bottom of the cylinder at such an angle that the cement will fall freely down the incline. A lining 11, of fire brick, is provided for the incline 10 to prevent the cement from burning the metal. A pipe 12, adapted to convey steam or air under pressure, is arranged with a bent nozzle 13 so that it will discharge its contents upwardly over the hot clinker or cement and into the channel between the baffle plate and the mouth of the kiln, as shown by the arrows 14. A second pipe 15 is extended upwardly and has a bent nozzle 16 adapted to discharge its contents downwardly into the channel between the baffle plate 9 and the cylinder, in the direction shown by the arrows 17.

In the alternative construction shown in Fig. 3, a baffle plate 8 is extended over the top of the cylinder, and the nozzle 16 of the pipe 15 inserted in the position shown to discharge the blast of air or steam downwardly, thus assisting the current of air represented by the arrows 14. Valves 18, for controlling the pressure, are placed in each pipe at convenient positions, while in Fig. 3 grate bars 19 are shown in the inclined way 10 over which the cement is made to travel and through which a stream of air enters from below, which air is heated in passing through the clinker and drawn upwardly by the draft from the nozzle 13.

The arrows 20 in the cylinder, indicate the direction which the flame of combustion assumes in passing therefrom.

The advantages of this apparatus will be readily apparent. A large proportion of the heat ordinarily lost in the discharge of the hot cement is recovered and forced into the kiln to assist in the operation of burning fresh cement. By forcing a stream of air around the outer circumference of the mouth of the kiln, the baffle plates are protected from too intense a heat, and, at the same time, the heated air mixes thoroughly with the inflammable gas and imparts to it the swirling motion which lengthens its path through the kiln. It is found that a much greater quantity of cement can be burned to the proper degree by applying this apparatus.

While I have shown the preferred form of the apparatus I wish to employ, I do not wish to limit myself to the precise construction disclosed, as several modifications of the device may be made without departing from the spirit of my invention.

Having thus described my invention so that the same may be readily understood by those skilled in the art to which it appertains, what I claim and desire to secure by Letters Patent is:—

1. In a device of the class described, means for discharging a quantity of pre-heated air into the kiln, and means for imparting to said air a swirling or revolving motion.

2. In a device of the class described, means for passing a quantity of air over the cement as it is discharged from the kiln, means for imparting a swirling or revolving motion to said air as it enters the kiln, and means for preventing the access of cold air at the mouth of the kiln.

3. In a device of the class described, means for passing a quantity of air over the cement as it is discharged from the kiln, means for thoroughly mixing said air with the flame of combustion, and means for preventing the access of cold air into the kiln and for imparting to the flame of combustion a circumferentially revolving motion.

4. In a device of the class described, means for passing a quantity of air or steam over the cement as it is discharged from the kiln, and means for deflecting said steam or air into the kiln with a circumferentially revolving motion.

5. In a device of the class described, means for pre-heating a quantity of air, and means for deflecting said air in a circumferential direction at the mouth of the kiln and discharging it into said kiln with a swirling or revolving motion.

6. In a device of the class described, means for discharging a quantity of inflammable gas into the kiln, a circumferential baffle plate at the mouth of the kiln, an inclined passage adapted to receive the cement as it drops from the kiln, and means for discharging a quantity of steam or air over said cement and against said baffle plate whereby it will be deflected into the kiln with a swirling or revolving motion.

7. In a cement kiln, means for discharging a stream of inflammable material into the kiln, a circumferential baffle plate located at the mouth of the kiln, an inclined passage upon which the cement is discharged from the kiln, a pipe for discharging a quantity of steam or air over said cement and against said baffle plate, and a second pipe adapted to discharge a supplementary quantity of steam or air against said baffle plate whereby the air will enter the kiln with a swirling or revolving motion to be thoroughly mixed with the inflammable material.

8. In a cement kiln, means for discharging a quantity of inflammable material into the kiln, a circumferential deflecting plate located at the mouth of the kiln and inclined downwardly at the bottom of the kiln in a tangential direction to form a passage way upon which the cement is discharged from the kiln, means for discharging a quantity of steam or air under pressure upwardly along said inclined passage whereby it will be heated by the cement and deflected into the kiln with a circumferentially revolving motion.

9. In a cement kiln, means for discharging a stream of inflammable material into the kiln, an inclined passage way upon which the cement is discharged from the kiln, circumferential baffle plates located at the mouth of the kiln, and means for discharging a quantity of air or steam against said baffle plates whereby it will be deflected into the kiln with a revolving or swirling motion.

10. In a cement kiln, means for discharging a stream of inflammable gas into the kiln, means for pre-heating a quantity of air, means for deflecting said air into the kiln with a circumferentially revolving motion, and means for excluding from the kiln all except such pre-heated air.

In witness whereof I have hereunto set my hand in the presence of two witnesses.

THOMAS MATTHEW MORGAN.

Witnesses:
C. W. TAYLOR,
C. GORMAN.